United States Patent
Yoshizawa

(10) Patent No.: US 7,879,505 B2
(45) Date of Patent: Feb. 1, 2011

(54) FUEL CELL HAVING FUEL AND OXIDATION GAS CHANNELS OF DIFFERENT CROSS-SECTIONS

(75) Inventor: Koudai Yoshizawa, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1057 days.

(21) Appl. No.: 11/632,119

(22) PCT Filed: Jul. 7, 2005

(86) PCT No.: PCT/JP2005/012969

§ 371 (c)(1),
(2), (4) Date: Jan. 11, 2007

(87) PCT Pub. No.: WO2006/016462

PCT Pub. Date: Feb. 16, 2006

(65) Prior Publication Data

US 2008/0038609 A1 Feb. 14, 2008

(30) Foreign Application Priority Data

Aug. 9, 2004 (JP) .............................. 2004-231753

(51) Int. Cl.
*H01M 8/02* (2006.01)
*H01M 8/04* (2006.01)
*H01M 4/86* (2006.01)

(52) U.S. Cl. ...................... 429/480; 429/518; 429/523

(58) Field of Classification Search ................... 429/26, 429/34, 480, 518, 523
See application file for complete search history.

(56) References Cited

U.S. PATENT DOCUMENTS

| 6,007,933 | A | 12/1999 | Jones | |
|---|---|---|---|---|
| 6,348,280 | B1 | 2/2002 | Maeda et al. | |
| 6,960,407 | B2 * | 11/2005 | Shibata et al. | ................. 429/44 |
| 2002/0064702 | A1 | 5/2002 | Gibb | |

FOREIGN PATENT DOCUMENTS

| DE | 42 37 602 A1 | 11/1994 |
|---|---|---|
| JP | 2004-234981 A | 8/2004 |

* cited by examiner

*Primary Examiner*—Gregg Cantelmo
(74) *Attorney, Agent, or Firm*—Foley & Lardner LLP

(57) ABSTRACT

A fuel cell includes a membrane electrode assembly (101); a first gas diffusion layer (104) having a first raised portion (104a); an anode side separator (102); a second gas diffusion layer (105) having a second raised portion (105a); and a cathode side separator (103). A fuel gas passage (102b) formed by a first groove (102a) and the first raised portion (104a) has a first cross section (A1), while an oxidation gas passage (103b) formed by a second groove (103a) and the second raised portion (105a) has a second cross section (A2). The first raised portion (104a) and the second raised portion (105a) are different from each other in scale, forming the first cross section (A1) and the second cross section (A2) different from each other.

22 Claims, 13 Drawing Sheets

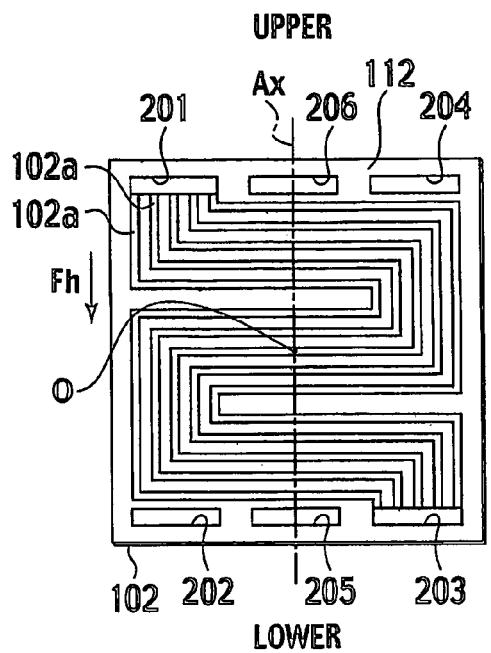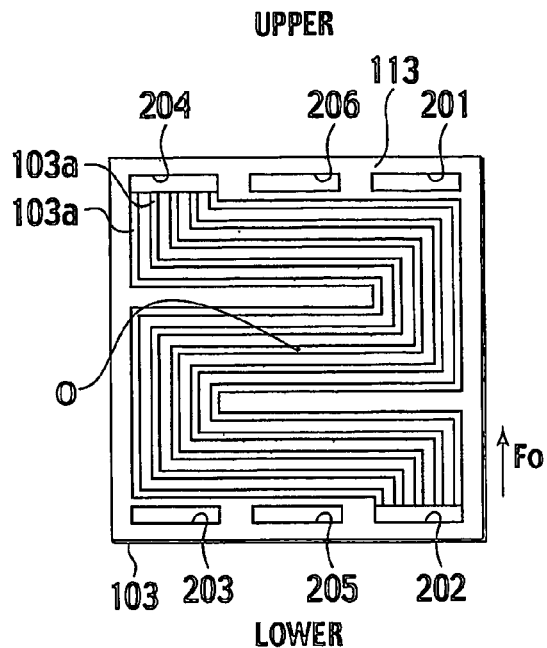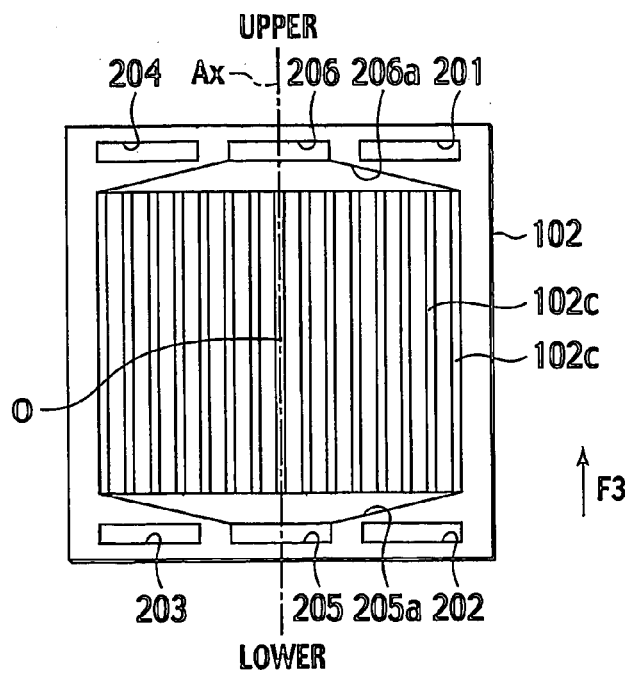

FUEL CELL HAVING FUEL AND OXIDATION GAS CHANNELS OF DIFFERENT CROSS-SECTIONS

TECHNICAL FIELD

The present invention relates to a fuel cell which is structured by compression with a membrane electrode assembly, an anode side separator and a cathode side separator, with respective gas diffusion layers interposed between the membrane electrode assembly and the separators. Specifically, the present invention relates to a technology for preventing diffusion failure of reaction gas, which failure may be caused by dew concentrated on an anode and a cathode, by modifying at least one of a fuel gas passage and an oxidation gas passage which are disposed, respectively in the anode side separator and the cathode side separator.

BACKGROUND ART

US2002/0064702 discloses a fuel cell in which the number of grooves distributing fuel gas in an anode side separator is differentiated from the number of grooves distributing oxygen gas in a cathode side separator, to thereby differentiate cross sections (specifically, total cross section of grooves) of reaction gas passages disposed in the respective electrode side separators. Alternatively, for the same number of grooves between the two electrode side separators, cross section of one groove is differentiated.

DISCLOSURE OF INVENTION

The above fuel cell of the related art is based on that required flow rate of the fuel gas in the operation of the fuel cell is smaller than required flow rate of oxidation gas. The above fuel cell has the following inconveniences.

Specifically, as the anode side separator and cathode side separator, two different separators are to be prepared which have passages defining cross sections that are made different from each other according to flow rates of the fuel gas and oxidation gas. Moreover, both on the anode side and the cathode side, contact portions between gas diffusion layers and corresponding separators may have equally smaller areas, increasing contact resistance between the gas diffusion layer and the separator, thereby suppressing output of the fuel cell.

It is an object of the present invention to provide a fuel cell having separators commonly used on an anode side and a cathode side. It is another object of the present invention to improve output of the fuel cell by decreasing contact resistance between a gas diffusion layer and the separator.

According to the present invention, there is provided a fuel cell, comprising: 1) a membrane electrode assembly including: i) an electrolyte membrane, ii) an anode formed on a first side of the electrolyte membrane, and iii) a cathode formed on a second side of the electrolyte membrane opposite to the first side; 2) a first gas diffusion layer configured to diffuse a fuel gas to the anode and having a first raised portion; 3) an anode side separator compressed to the anode with the first gas diffusion layer interposed between the membrane electrode assembly and the anode side separator, wherein the anode side separator has a first contact face between the anode side separator and the first gas diffusion layer, the first contact face being formed with a first groove configured to distribute the fuel gas which is to be diffused to the anode, the first raised portion being raised into the first groove from the first contact face, and a fuel gas passage being formed in the first groove as a part other than the first raised portion of the first gas diffusion layer and having a first cross section; 4) a second gas diffusion layer configured to diffuse an oxidation gas to the cathode and having a second raised portion; and 5) a cathode side separator compressed to the cathode with the second gas diffusion layer interposed between the membrane electrode assembly and the cathode side separator, wherein the cathode side separator has a second contact face between the cathode side separator and the second gas diffusion layer, the second contact face being formed with a second groove configured to distribute the oxidation gas which is to be diffused to the cathode, the second raised portion being raised into the second groove from the second contact face, and an oxidation gas passage being formed in the second groove as a part other than the second raised portion of the second gas diffusion layer and having a second cross section. The first raised portion and the second raised portion are different from each other in scale, whereby the first cross section of the fuel gas passage and the second cross section of the oxidation gas passage are different from each other.

Other and further features, advantages and benefits of the present invention will become apparent from the following description in conjunction with the following drawings.

BRIEF DESCRIPTION OF DRAWINGS

FIG. 5A shows a deformation allowance of porous material, to a compression force F, while

FIG. 11A and FIG. 11B respectively show reaction gas passages on anode side bipolar plate and cathode side bipolar plate, according to a fifth embodiment.

FIG. 12 shows a cooling water passage, according to the fifth embodiment.

BEST MODE FOR CARRYING OUT THE INVENTION

Hereinafter, fuel cells of respective embodiments of the present invention are described in detail with reference to the accompanying drawings.

First Embodiment

Figure 1:
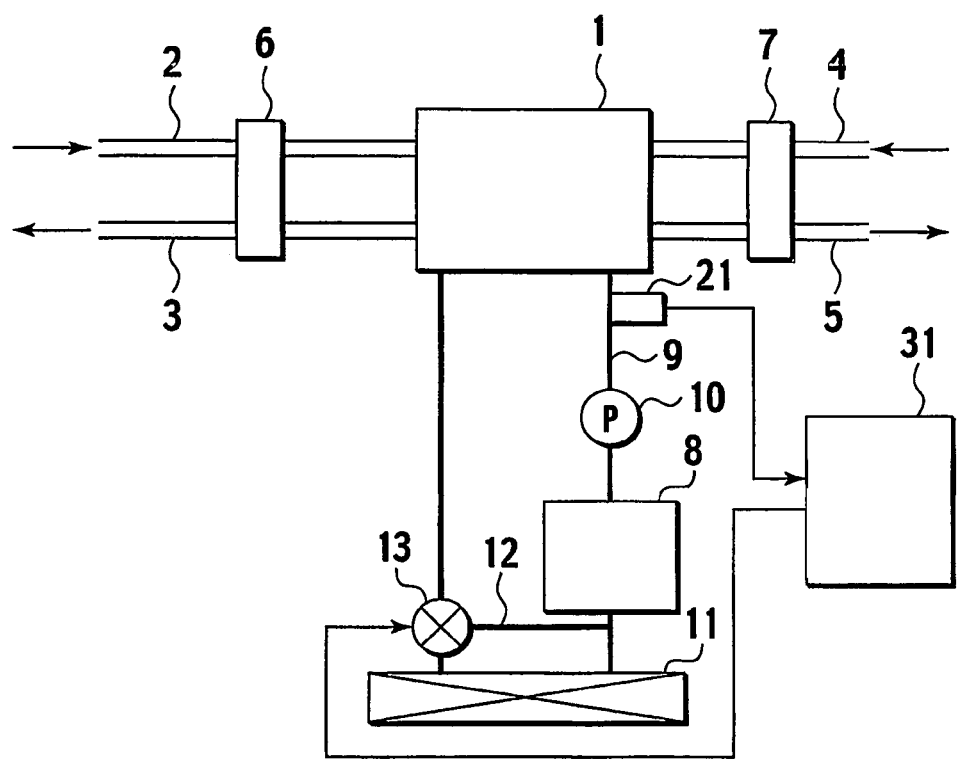
FIG. 1 shows a cross section of a fuel cell, according to a first embodiment of the present invention.

FIG. 1 shows a structure of a fuel cell according to a first embodiment of the present invention. Hereinafter, the fuel cell having the above structure according to the first embodiment is to be used for the following embodiments (excluding the ninth embodiment).

The fuel cell according to the first embodiment includes a fuel cell body 1 and accessories for operating the fuel cell.

Connected to the fuel cell body 1 on an anode side include a fuel gas supply tube 2 distributing a supplied fuel gas (herein, hydrogen), and a fuel gas discharge tube 3 distributing discharge hydrogen after a power producing reaction. A high pressure hydrogen tank (not shown) is connected to the fuel gas supply tube 2, and hydrogen stored in the high pressure hydrogen tank is supplied to the fuel cell body 1 after being depressed to a predetermined pressure by means of a pressure control valve. The discharge hydrogen is sent out to the fuel gas discharge tube 3, and is supplied to a combustor (not shown) and the like by way of the fuel gas discharge tube 3. In addition, connected to a cathode side include an oxidation gas supply tube 4 distributing a supplied oxidation gas (herein, air), and an oxidation gas discharge tube 5 distributing discharge air after the power producing reaction. There is disposed a compressor (not shown) and an air cleaner (not shown) in the oxidation gas supply tube 4, an atmospheric air is to be absorbed into the oxidation gas supply tube 4 by way of the air cleaner, to be supplied to the fuel cell body 1. The discharge air is to be supplied to the combustor by way of the oxidation gas discharge tube 5. Disposing the discharge hydrogen is carried out by combustion, but not limited thereto. Diluting the discharge hydrogen with the discharge air may be adopted.

According to the first embodiment, for the purpose of securing the fuel cell body 1's output as well as protecting an after-described electrolyte membrane 50, the fuel gas supply tube 2 and the oxidation gas supply tube 4 are respectively provided with a humidifier 6 and a humidifier 7. On the anode side, the humidifier 6 disposed at the fuel gas supply tube 2 adjusts humidity of hydrogen supplied to the fuel cell body 1, and is so structured as to include a membrane or a plate (which plate is hollow or made of porous material) for exchanging moisture with the discharge hydrogen. On the cathode side, the humidifier 7 disposed at the oxidation gas supply tube 4 adjusts humidity of the air supplied to the fuel cell body 1. Like the humidifier 6, the humidifier 7 is so structured as to include a membrane and the like for exchanging moisture with the discharge air.

On the other hand, the accessories include a cooling device properly keeping temperature of the fuel cell body 1. The cooling device is so structured as to include a tank 8 storing a coolant (for example, antifreeze liquid having ethylene glycol as the main component) to be circulated to the fuel cell body 1, a coolant circulating passage 9, a power pump 10 which circulates the coolant in the tank 8 to the fuel cell body 1, a radiator 11 interposed in the coolant circulating passage 9, a bypass passage 12 flowing the coolant bypassing the radiator 11, and a bypass control valve 13 controlling flow rate of the coolant in the bypass passage 12. The cooling water circulating passage 9 is provided with a temperature sensor 21 for sensing temperature of the coolant, and the output of the temperature sensor 21 is inputted to a control unit 31.

The control unit 31 controls flow rate of supplying hydrogen and air according to a load required for the fuel cell, and adjusts hydrogen humidity and air humidity according to the above flow rate. In addition, based on the thus inputted temperature of the coolant, the control unit 31 controls the bypass control valve 13, to thereby control temperature of the fuel cell body 1 within a predetermined range.

Figure 2A:
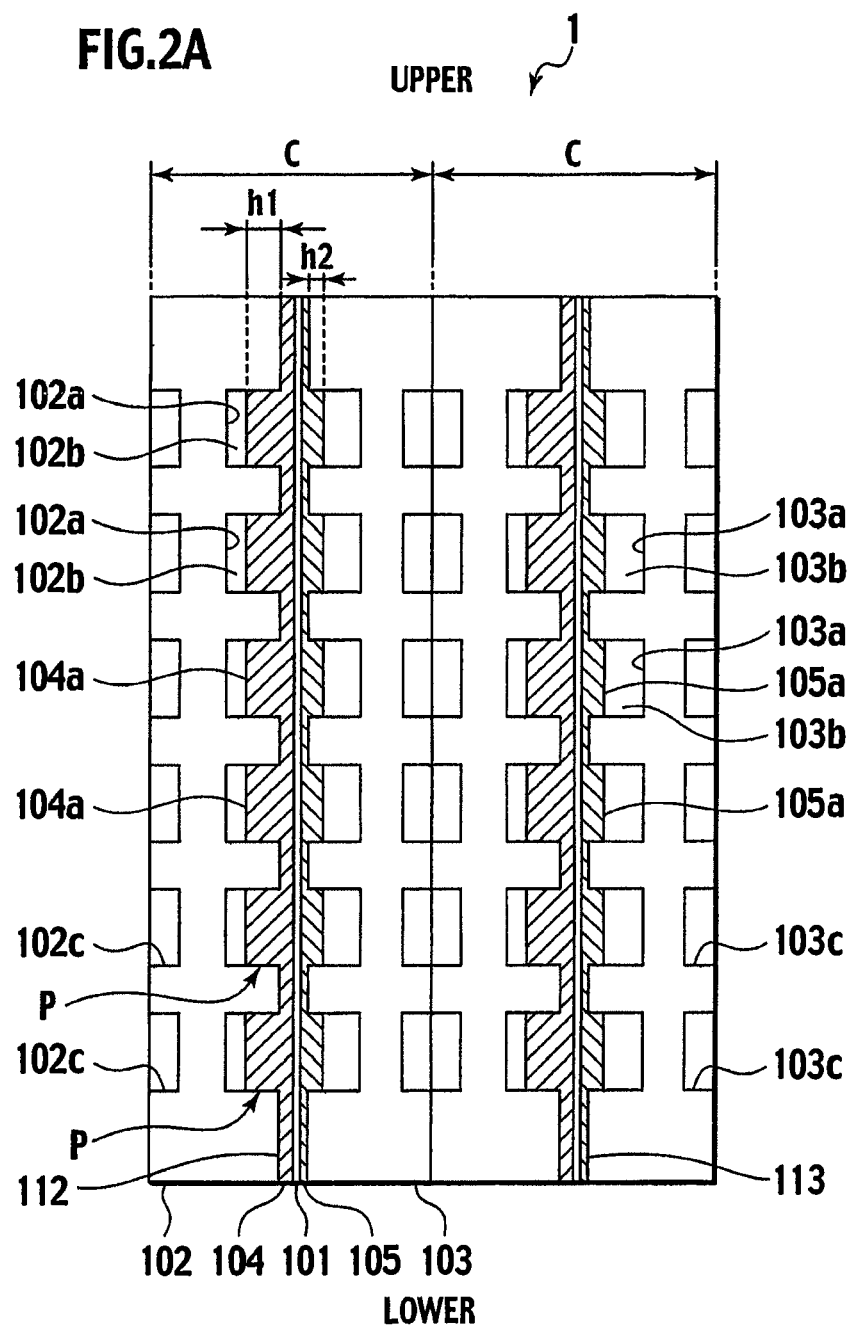
FIG. 2A shows a schematic of a cross section of a fuel cell body.
Figure 2B:
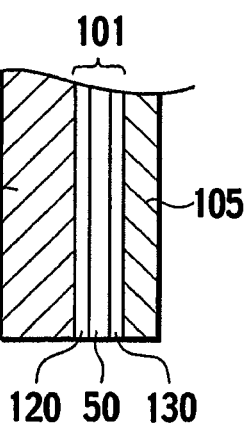
FIG. 2B shows a partly enlarged view of FIG. 2A, detailing a structure of membrane electrode assembly.

FIG. 2A shows a schematic of a cross sectional structure of the fuel cell body 1; and FIG. 2B shows a partly enlarged view of FIG. 2A, detailing a structure of membrane electrode assembly.

According to the first embodiment, a solid polymer (or polymer electrolyte) membrane is adopted as the electrolyte membrane 50, where an anode 120 is formed on a first side of the electrolyte membrane 50, and a cathode 130 is formed on a second side of the electrolyte membrane 50, thereby structuring a membrane electrode assembly 101. On the first side and the second side of the membrane electrode assembly 101, respectively, there are located a bipolar plate 102 as an anode side separator and a bipolar plate 103 as a cathode side separator, and the bipolar plate 102 and the bipolar plate 103 are compressed via a gas diffusion layer 104 and a gas diffusion layer 105 respectively, to thereby structure a unit cell C. The fuel cell body 1 is so structured that the number of unit cells C to be stacked are determined according to required output. In a contact face 112 on the membrane electrode assembly 101 side of the anode side bipolar plate 102, there is formed a groove 102a corresponding to the anode 120. The hydrogen supplied to the fuel cell body 1 travels throughout the anode 120 via the groove 102a, to be diffused to the anode 120 by means of the gas diffusion layer 104. In a contact face 113 on the membrane electrode assembly 101 side of the cathode side bipolar plate 103, there is formed a groove 103a corresponding to the cathode 130. The air supplied to the fuel cell body 1 travels throughout the cathode 130 via the groove 103a, to be diffused to the cathode 130 by means of the gas diffusion layer 105.

According to the first embodiment, a porous material is used for the gas diffusion layers 104, 105 on the respective anode side and cathode side. While being equal in porosity, the porous materials of the gas diffusion layers 104, 105 have different initial thicknesses before compression with the membrane electrode assembly 101, thereby differentiating deformation allowances per compression force. According to the first embodiment, thickening the porous material of the anode gas diffusion layer 104 brings about the following structure: with respect to the gas diffusion layers 104, 105, raised portions 104a, 105a are made different in scale (herein, height h1 and height h2) between the anode side and the cathode side, where the raised portions 104a, 105a are each free from a face pressure from a rib of the respective anode side bipolar plate 102 and cathode side bipolar plate 103 in the compression, and raise to inside of the respective grooves 102a, 103a after the compression. In addition, the groove 102a and the groove 103a are made substantially equal in width and depth between the anode side bipolar plate 102 and the cathode side bipolar plate 103 and the deformation allowances are made different between the gas diffusion layer 104 and the gas diffusion layer 105, to thereby differentiate cross sections of passages 102b, 103b, each of which is formed as a part other than one of the respective raised portions 104a, 105a in the grooves 102a, 103a. The passage 102b formed in the groove 102a may serve as a substantial fuel gas passage of the anode side bipolar plate 102, while the passage 103b formed in the groove 103a may serve as a substantial oxidation gas passage in the cathode side bipolar plate 103. According to the first embodiment, making the raised portion 104a of the anode gas diffusion layer 104 larger can make the cross section of the fuel gas passage 102b smaller than the cross section of the oxidation gas passage 103b.

In addition, according to the first embodiment, as a passage distributing the coolant in the fuel cell body 1, a groove 102c is formed on an opposite face to the contact face 112 of the anode side bipolar plate 102, and moreover, a groove 103c is formed on an opposite face to the contact face 113 of the cathode side bipolar plate 103 in such a manner as to correspond to the groove 102c of the anode side bipolar plate 102.

Figure 3:
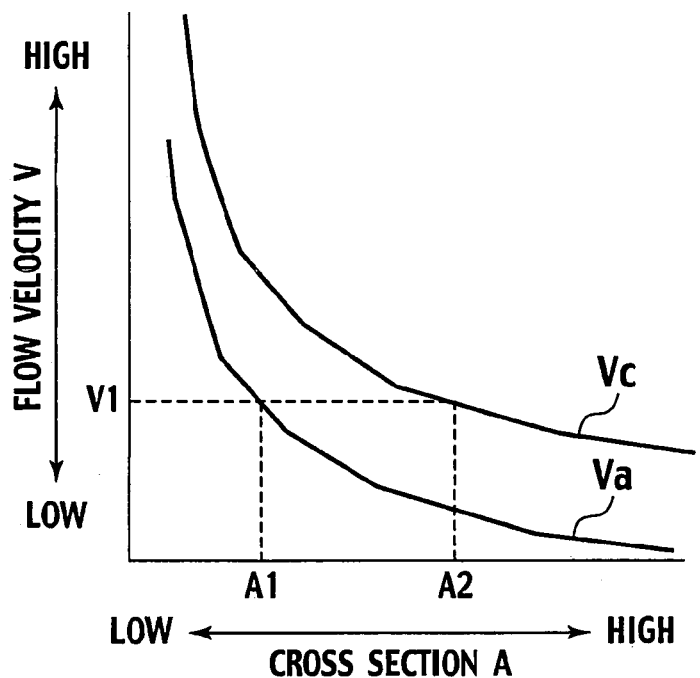
FIG. 3 shows flow velocity V of a reaction gas to a cross section A of a reaction gas passage.

FIG. 3 shows flow velocity V of reaction gas to a cross section A of the fuel gas passage 102b or the oxidation gas passage 103b. Flow velocity of the hydrogen in the fuel gas passage 102b is denoted by Va, while flow velocity of the air in the oxidation gas passage 103b is denoted by Vc. During operation of the fuel cell body 1, required flow rate of hydrogen is lower than the required flow rate of air. Therefore, for obtaining flow velocities V1 substantially equal between the fuel gas passage 102b and the oxidation gas passage 103b, the cross section on the anode side (=A1) is made smaller than the cross section on the cathode side (=A2). According to the first embodiment, the raised portions 104a, 105a of the respective anode gas diffusion layer 104 and cathode gas diffusion layer 105 are made different in scale and thereby the cross section of the fuel gas passage 102b is made smaller than the cross section of the oxidation gas passage 103b, resulting in the flow velocities V1 substantially equal between the fuel gas passage 102b and the oxidation gas passage 103b.

Figure 4:
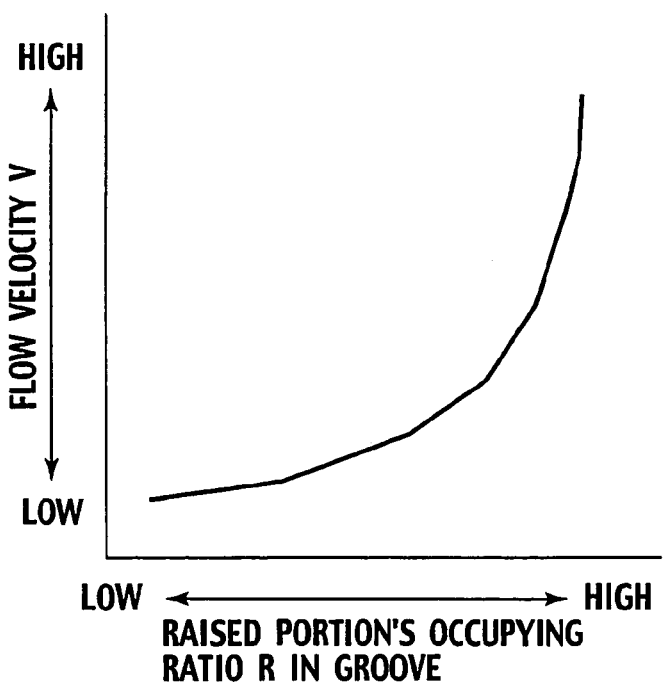
FIG. 4 shows flow velocity V of the hydrogen or the air to raised portion's ratios R occupying in grooves.

FIG. 4 shows the flow velocity V of the hydrogen or the air relative to raised portions 104a, 105a's ratios R occupying respectively in the grooves 102a, 103a. The raised portions 104a, 105a have a feature of transmitting gas with a coefficient according to the number of porosities. It is obvious, however, that the above transmission coefficient of the raised portions 104a, 105a is smaller than that of the fuel gas passage 102b or the oxidation gas passage 103b, making the gas less transmittable. Though dimensions of the grooves 102a, 103a are made substantially equal, differentiating the raised portions 104a, 105a in scale can differentiate the cross sections between the substantial passage 102b, 103b of the respective hydrogen and air, to thereby increase or decrease the flow velocity.

Figure 5A:
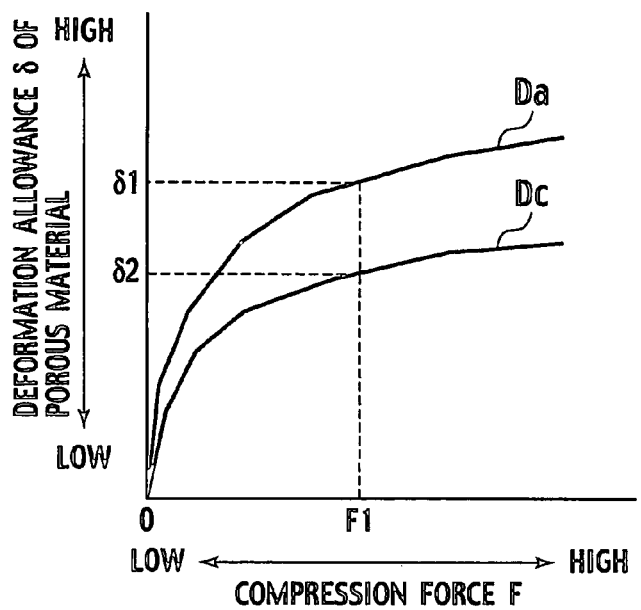
Figure 5B:
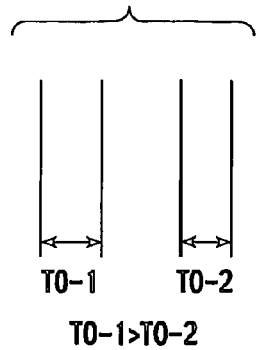
FIG. 5B shows initial thicknesses.

FIG. 5A shows deformation amount (herein, deformation allowance) δ of the porous material before and after the compression, relative to a compression force F of compressing the porous materials having different initial thicknesses T0-1, T0-2 (T0-1>T0-2) as shown in FIG. 5B. Deformation amount of the porous material having large initial thickness T0-1 is denoted by Da, while deformation amount of the porous material having small initial thickness T0-2 is denoted by Dc. Herein, the porous material having the deformation amount Da and the porous material having the deformation amount Dc are made substantially equal in porosity. Making the initial thickness larger can make the deformation allowance δ (=δ1) of the porous material larger which deformation allowance is attributable to the compression. In the fuel cell body 1, making the raised portion 104a of the anode gas diffusion layer 104 larger can decrease the cross section of the fuel gas passage 102b.

Figure 6A:
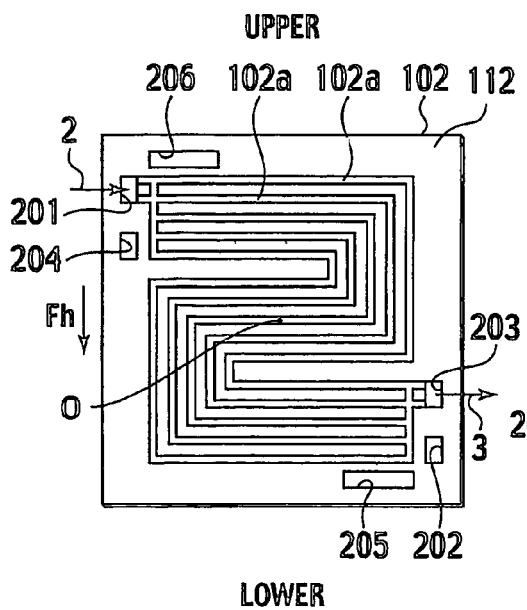
FIG. 6A and FIG. 6B respectively show reaction gas passages on anode side bipolar plate and cathode side bipolar plate, according to the first embodiment.
Figure 6B:
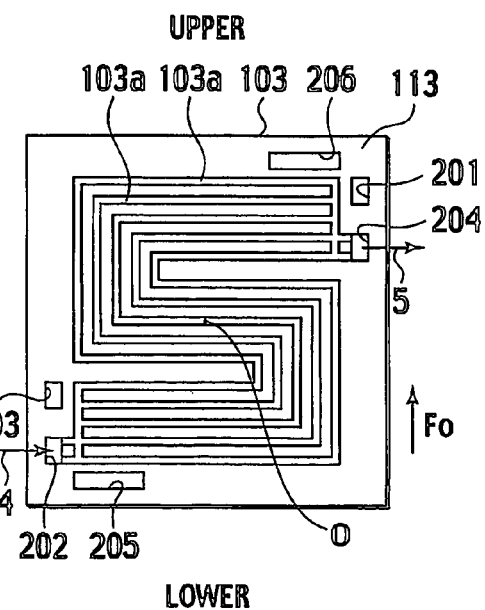

FIG. 6A shows the contact face 112 on the membrane electrode assembly 101 side of the anode side bipolar plate 102 while FIG. 6B shows the contact face 113 on the membrane electrode assembly 101 side of the cathode side bipolar plate 103.

Hereinabove, FIG. 6A is viewed from right side in FIG. 2A, while FIG. 6B is viewed from left side in FIG. 2A. Hereinafter, FIG. 6A's and FIG. 6B's counterpart drawings according to the following embodiments relative to FIG. 2A in respect of viewing direction are to be understood likewise.

In the anode side bipolar plate 102 and the cathode side bipolar plate 103, there are formed a manifold (hereinafter referred to as "first manifold") 201 supplying the fuel gas and a manifold (hereinafter referred to as "second manifold") 202 supplying the oxidation gas in a position which is upstream of the faces opposing the electrodes, specifically, upstream in substantial flow directions (herein, up and down directions of the fuel cell body 1 in a state where the fuel cell body 1 is mounted) Fh, Fo of the hydrogen and air. Moreover, there are formed a manifold (hereinafter referred to as "third manifold") 203 discharging the fuel gas and a manifold (hereinafter referred to as "fourth manifold") 204 discharging the oxidation gas in a position which is downstream of the faces opposing the electrodes. In the anode side bipolar plate 102, the groove 102a connects to the first and third manifolds 201, 203, in such a manner as to meander between the first manifold 201 and the third manifold 203 in a direction perpendicular to the hydrogen flow direction Fh. On the other hand, in the cathode side bipolar plate 103, the groove 103a connects to the second and fourth manifolds 202, 204, in such a manner as to meander between the second manifold 202 and the fourth manifold 204 in a direction perpendicular to the air flow direction Fo. In addition, the anode side bipolar plate 102 and the cathode side bipolar plate 103 are formed of fifth and sixth manifolds 205, 206 distributing the supplied or discharged coolant.

The grooves 102c, 103c of the respective bipolar plates 102, 103 connect to the fifth and sixth manifolds 205, 206.

According to the first embodiment, the following effects can be brought about.

(Effect 1)

Firstly, the raised portion 104a of the anode gas diffusion layer 104 is made larger than the raised portion 105a of the cathode gas diffusion layer 105. With the above structure, even when the grooves 102a, 103a of the respective bipolar plates 102, 103 are made equal in dimension, the cross sections of the substantial passages 102b, 103b of the reaction gas can be differentiated, thus substantially equalizing the flow velocities of the reaction gases in the respective passages 102b, 103b. With this, even when the required flow rate of hydrogen is low, the flow velocity in the fuel gas passage 102b can be increased, to thereby preferably discharge the vapor in the passage 102b, thus suppressing the dew concentration.

(Effect 2)

Figure 18:
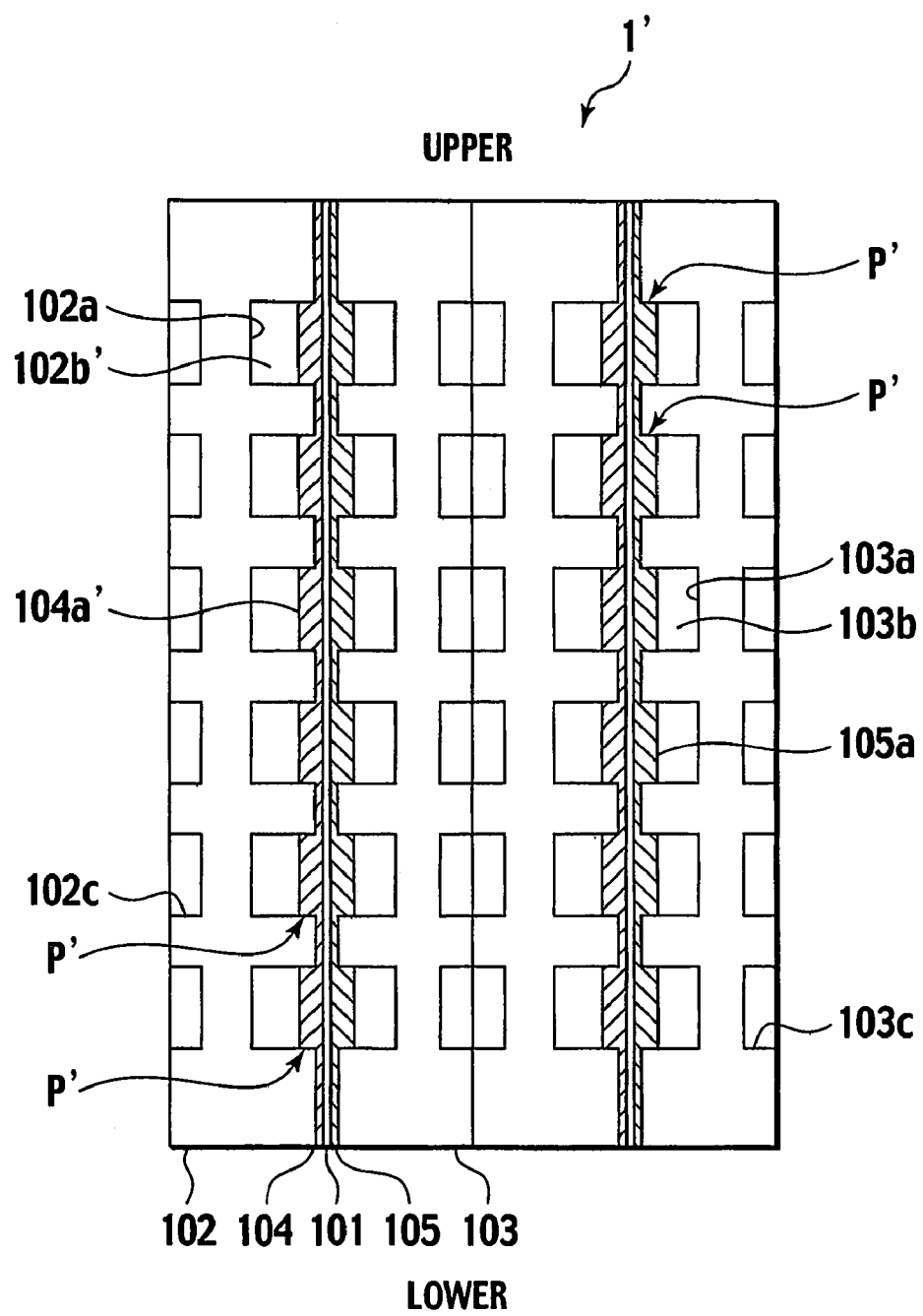
FIG. 18 shows a structure of a fuel cell body, according to a comparative example.

Secondly, the raised portion 104a of the anode gas diffusion layer 104 is made relatively larger, corresponding to this, making larger the area of a contact portion P (FIG. 2A) between the gas diffusion layer 104 and the anode side bipolar plate 102, thereby decreasing contact resistance between the gas diffusion layer 104 and the anode side bipolar plate 102, which contributes to increase of the output of the fuel cell. In addition, as a comparative example, raised portions 104a', 105a are equalized in scale between the anode side and the cathode side (FIG. 18). In this comparative example, on both the anode side and the cathode side, the area of the connect portion P between the gas diffusion layers 104, 105 and the corresponding bipolar plates 102, 103 are made small, thereby increasing the connect resistance.

According to the first embodiment, the porous material forming the anode gas diffusion layer 104 and the porous material forming the cathode gas diffusion layer 105 are differentiated in initial thickness and the deformation amounts δ of the porous materials are differentiated before and after the compression, thereby differentiating the raised portions 104a, 105a in scale. For differentiating the raised portion 104a from the raised portion 105a in scale, the above method of differentiating the initial thickness of the porous material is adopted. Otherwise, differentiating compression stiffness to thereby differentiate the porous material's deformation amount δ per compression force is allowed. Specifically, equalizing in initial thickness the porous material of the anode gas diffusion layer 104 with the porous material of the cathode gas diffusion layer 105 while making the porosity of the former porous material larger than the porosity of the latter porous material can decrease the compression stiffness of the former, thereby differentiating the raised portions 104a, 105a in scale.

Figure 7:
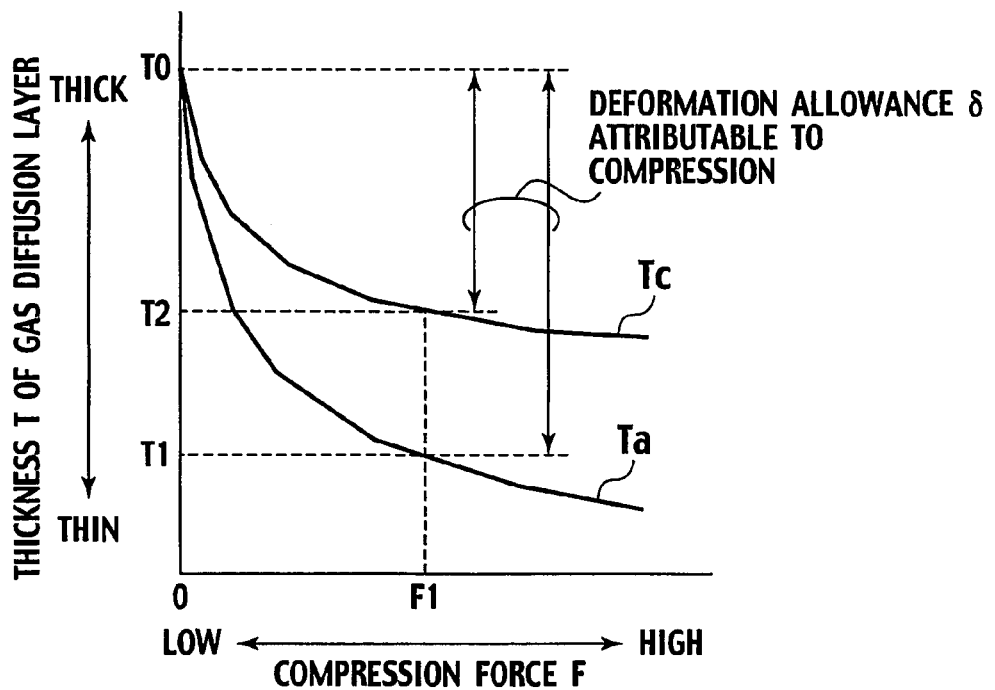
FIG. 7 shows thickness T of gas diffusion layer after compression, to the compression force F.

FIG. 7 shows thickness T of the gas diffusion layers 104, 105 after the compression, relative to the compression force F for compressing the porous material having different porosities. Thickness of the porous material of the anode gas diffusion layer 104 is denoted by Ta while thickness of the porous material of the cathode gas diffusion layer 105 is denoted by Tc, with the initial thickness of the above porous materials denoted by T0. Relative to the latter porous material, the former porous material is made larger in porosity and is made smaller in compression stiffness, thereby making small the thickness (=T1) after the compression, thus making large the deformation amount (that is, deformation allowance δ) attributable to the compression. Herein, the above deformation allowance δ corresponds to the height h1 and height h2 (FIG. 2A) of the respective raised portions 104a, 105a.

Hereinafter described are other embodiments of the present invention.

Second Embodiment

Figure 8A:
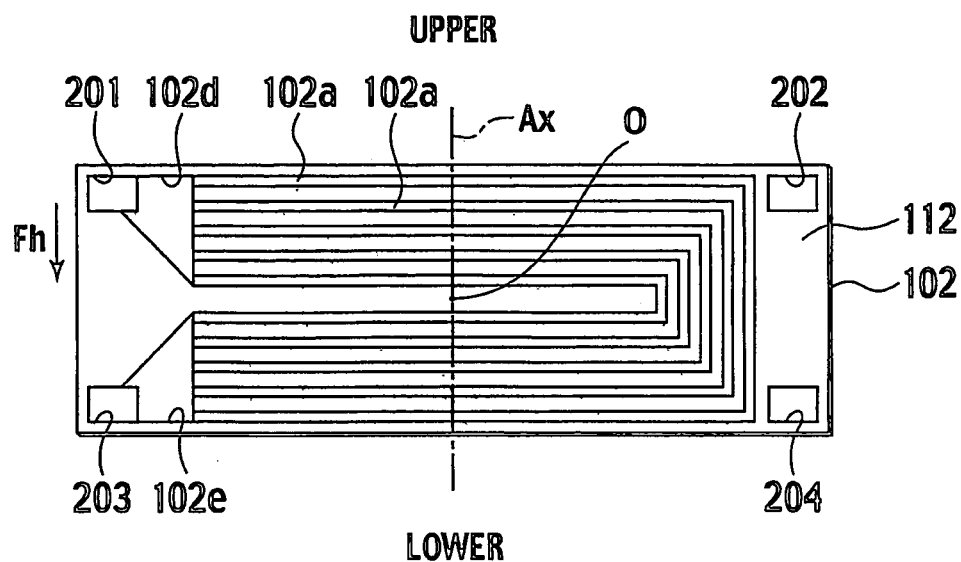
FIG. 8A and FIG. 8B respectively show reaction gas passages on anode side bipolar plate and cathode side bipolar plate, according to a second embodiment.
Figure 8B:
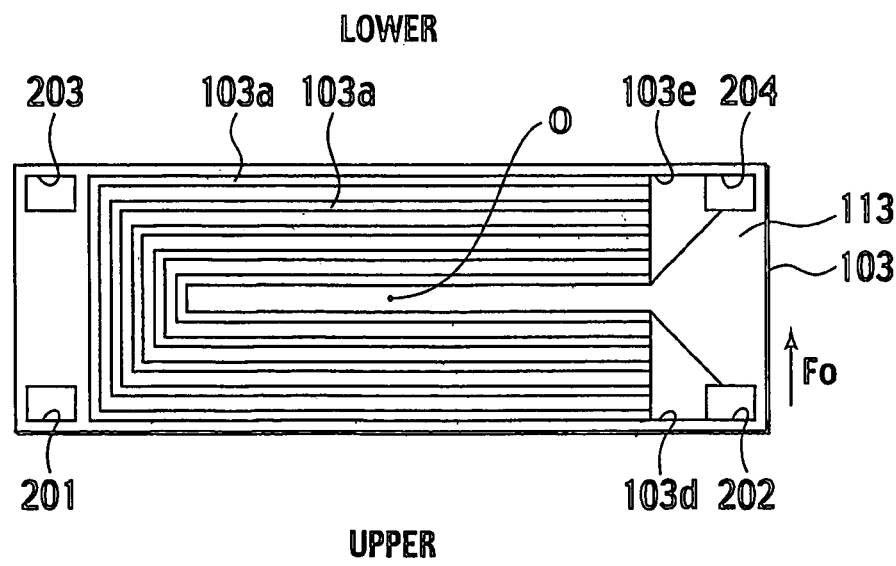

FIG. 8A shows the contact face 112 on the membrane electrode assembly 101 side of the anode side bipolar plate 102 while FIG. 8B shows the contact face 113 on the membrane electrode assembly 101 side of the cathode side bipolar plate 103 which bipolar plates structuring the fuel cell, according to a second embodiment of the present invention.

According to the second embodiment, of the anode side bipolar plate 102 and the cathode side bipolar plate 103, on a first edge (left side in FIG. 8) of the fuel cell body 1, there are formed two manifolds 201, 203 (respectively supplying and discharging the fuel gas) connecting to the groove 102a of the anode side bipolar plate 102. In addition, on a second edge opposite to the first edge, there are formed two manifolds 202, 204 (respectively supplying and discharging the oxidation gas) connecting to the groove 103a of the cathode side bipolar plate 103. The latter two manifolds 202, 204 are formed in such a position as to be line-symmetrical to the former two manifolds 201, 203 with respect to a symmetry axis Ax, where the symmetry axis Ax crosses a center axis O of the fuel cell body 1 and extends in parallel with the fuel gas flow direction Fh (herein, lower direction) and the oxidation gas flow direction Fo (herein, upper direction) on the contact faces 112, 113. Between the manifolds 201, 203 of the fuel, the groove 102a of the anode side bipolar plate 102 is so formed as to returnably extend in a direction perpendicular to the fuel gas flow direction Fh. Between the manifolds 202, 204 of the oxidation gas, the groove 103a of the cathode side bipolar plate 103 is so formed as to returnably extend in a direction perpendicular to the oxidation gas flow direction Fo. In addition, the manifolds 201, 202, 203, 204 connect to the corresponding grooves 102a, 103a via the passage's increased or decreased portions 102d, 102e, 103d, 103e each of which is in a form of a groove having continuously increased or decreased width. The grooves 102a, 102d, 102e (including the increased portion and the decreased portion) disposed at the anode side bipolar plate 102 are substantially the same in shape respectively with the grooves 103a, 103d, 103e (including the increased portion and the decreased portion) disposed at the cathode side bipolar plate 103. Herein, the gas diffusion layers 104, 105 on the respective anode side and cathode side have their raised portions 104a, 105a differentiated in scale by differentiating initial thickness or compression stiffness of their porous materials, like those according to the first embodiment.

According to the second embodiment, on the contact faces 112, 113, the manifolds 201, 202, 203, 204 and the grooves 102a, 102d, 102e, 103a, 103d, 103e are so shaped and located as to be rotarily turned around the symmetry axis Ax and reversed. With the above structure, the bipolar plate 102 and the bipolar plate 103 can be used in common between the anode side and the cathode side, which is another effect in addition to the effect 1 and the effect 2.

Third Embodiment

Figure 9A:
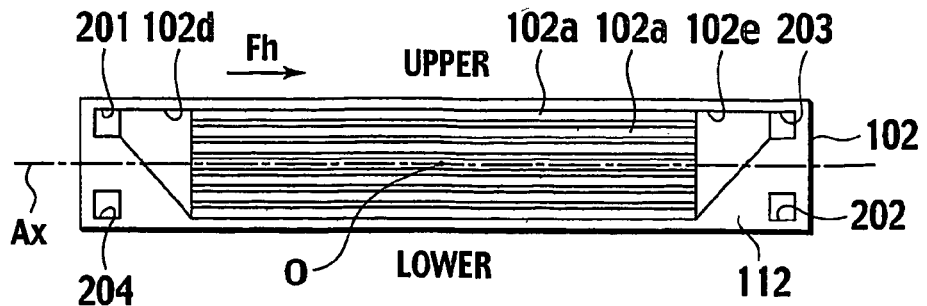
FIG. 9A and FIG. 9B respectively show reaction gas passages on anode side bipolar plate and cathode side bipolar plate, according to a third embodiment.
Figure 9B:
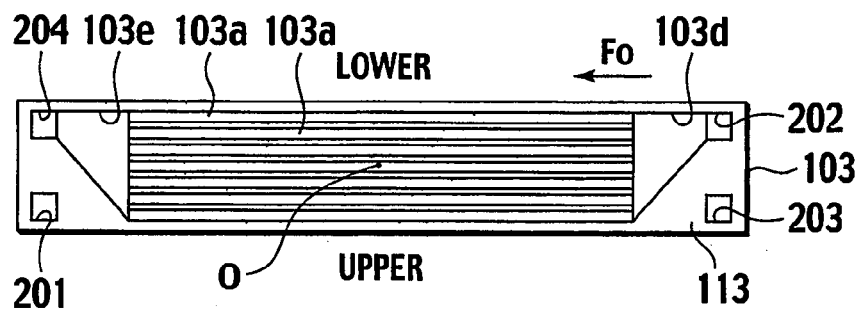

FIG. 9A shows the contact face 112 of the anode side bipolar plate 102 while FIG. 9B shows the contact face 113 of the cathode side bipolar plate 103 which bipolar plates structuring the fuel cell, according to a third embodiment of the present invention.

According to the third embodiment, of the anode side bipolar plate 102 and the cathode side bipolar plate 103, on a first edge (upper side in FIG. 9) of the fuel cell body 1, there are formed two manifolds 201, 203 (respectively supplying and discharging the fuel gas) connecting to the groove 102a of the anode side bipolar plate 102. In addition, on a second edge (lower side in FIG. 9) opposite to the first edge, there are formed two manifolds 202, 204 (respectively supplying and discharging the oxidation gas) connecting to the groove 103a of the cathode side bipolar plate 103. The latter two manifolds 202, 204 and the former two manifolds 201, 203 are line-symmetrical, like those according to the second embodiment. According to the third embodiment, however, the fuel gas flow direction Fh and the oxidation gas flow direction Fo on the contact faces 112, 113 extend in the right and left directions, and the symmetry axis Ax is perpendicular to that according to the second embodiment. In addition, according to the third embodiment, the grooves 102a, 103a are so linearly formed as to unreturnably extend, connecting to the corresponding manifolds 201, 202, 203, 204 via the increased or decreased portions 102d, 102e, 103d, 103e. With respect to the symmetry axis Ax, the grooves 102a, 102d, 102e of the anode side bipolar plate 102 are so formed as to be line-symmetrical to the grooves 103a, 103d, 103e of the cathode side bipolar plate 103. Herein, the gas diffusion layers 104, 105 on the respective anode side and cathode side have their raised portions 104a, 105a differentiated in scale by differentiating initial thickness or compression stiffness of their porous materials, like those according to the first embodiment.

According to the third embodiment, on the contact faces 112, 113, the manifolds 201, 202, 203, 204 and the grooves 102a, 102d, 102e, 103a, 103d, 103e are so shaped and located as to be reversed with respect to the symmetry axis Ax extending in the right- and left direction. With the above structure, the bipolar plate 102 and the bipolar plate 103 can be used in common between the anode side and the cathode side, which is another effect in addition to the effect 1 and the effect 2. In addition, according to the third embodiment, the grooves 102a, 103a are linearly formed and are parallel, thereby opposing the fuel gas flow direction Fh to the oxidation gas flow direction Fo on the contact faces 112, 113. With the above structure, water can be actively exchanged between the anode side bipolar plate 102 and the cathode side bipolar plate 103 which are disposed via the electrolyte membrane 50, to thereby equalize wetting state throughout the cell. Herein, in the case that the fuel gas flow direction Fh and the oxidation gas flow direction Fo are made in the same direction according to humidifying state before supplying the reaction gas, the above two directions can be completely the same.

Fourth Embodiment

Figure 10A:
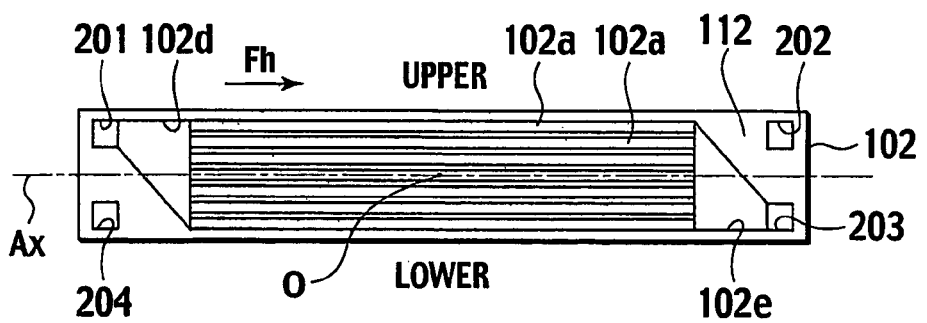
FIG. 10A and FIG. 10B respectively show reaction gas passages on anode side bipolar plate and cathode side bipolar plate, according to a fourth embodiment.
Figure 10B:
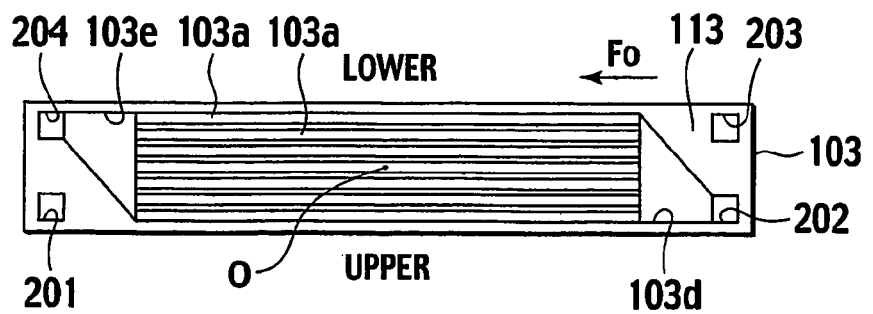

FIG. 10A shows the contact face 112 of the anode side bipolar plate 102 while FIG. 10B shows the contact face 113 of the cathode side bipolar plate 103 which bipolar plates structuring the fuel cell, according to a fourth embodiment of the present invention.

According to the fourth embodiment, on the contact faces 112, 113, on a first diagonal line, there are formed two manifolds 201, 203 (respectively supplying and discharging the fuel gas) connecting to the groove 102a of the anode side bipolar plate 102. In addition, on a second diagonal line opposite to the first diagonal line, there are formed two manifolds 202, 204 (respectively supplying and discharging the oxidation gas) connecting to the groove 103a of the cathode side bipolar plate 103. The latter two manifolds 202, 204 are formed in such a position as to be line-symmetrical to the former two manifolds 201, 203 with respect to the symmetry axis Ax, where the symmetry axis Ax crosses the center axis O of the fuel cell body 1 and extends in parallel with the fuel gas flow direction Fh (herein, right direction) and the oxidation gas flow direction Fo (herein, left direction) on the contact faces 112, 113. In addition, according to the fourth embodiment, the grooves 102a, 103a are linearly formed and connect to the corresponding manifolds 201, 202, 203, 204 via the increased or decreased portions 102d, 102e, 103d, 103e, like those according to the third embodiment. Herein, the raised portions 104a, 105a of the respective anode gas diffusion layer 104 and cathode gas diffusion layer 105 are differentiated in scale, like those according to the first embodiment.

According to the fourth embodiment, in addition to the effect 1 and the effect 2, the following effects can be brought about for the reason like that of the third embodiment: i) the bipolar plate 102 and the bipolar plate 103 can be used in common between the anode side and the cathode side, and ii) opposing the fuel gas flow direction Fh to the oxidation gas flow direction Fo on the contact faces 112, 113 allows the water to be actively exchanged between the anode side bipolar plate 102 and the cathode side bipolar plate 103. In addition, according to the fourth embodiment, on the contact faces 112, 113, an outlet of the fuel gas and an outlet of the oxidation gas are disposed on the lower side with respect to gravity, thereby smoothly discharging to the manifolds 203, 204 the electrical product water in the grooves 102a, 103a.

Fifth Embodiment

FIG. 11A shows the contact face 112 of the anode side bipolar plate 102 while FIG. 11B shows the contact face 113 of the cathode side bipolar plate 103 which bipolar plates structuring the fuel cell, according to a fifth embodiment of the present invention.

According to the fifth embodiment, in the bipolar plates 102, 103, the two manifolds 201, 203 (respectively supplying and discharging the fuel gas) connecting to the groove 102a of the anode side bipolar plate 102 are formed on a first diagonal line, while the two manifolds 202, 204 (respectively supplying and discharging the oxidation gas) connecting to the groove 103a of the cathode side bipolar plate 103 are formed on a second diagonal line. The latter two manifolds 202, 204 are formed in such a position as to be line-symmetrical to the former two manifolds 201, 203 with respect to the symmetry axis Ax, where the symmetry axis Ax crosses the center axis O of the fuel cell body 1 and extends in parallel with the fuel gas flow direction Fh (herein, lower direction) and the oxidation gas flow direction Fo (herein, upper direction) on the contact faces 112, 113. The groove 102a of the anode side bipolar plate 102 is so formed as to meander in a direction perpendicular to the fuel gas flow direction Fh, while the groove 103a of the cathode side bipolar plate 103 is so connected as to meander in a direction perpendicular to the oxidation gas flow direction Fo. According to the fifth embodiment, the grooves 102a, 103a are so formed as to be rotarily symmetrical (point symmetrical) with respect to the center axis O of the fuel cell body 1. In addition, according to the fifth embodiment, in the bipolar plates 102, 103, on a first edge (upper) and an opposing second edge (lower) of the fuel cell body 1, there are formed two manifolds 205, 206 supplying or discharging the coolant. The manifolds 205, 206 are disposed on the symmetry axis Ax. Herein, the gas diffusion layers 104, 105 on the respective anode side and cathode side have their raised portions 104a, 105a differentiated in scale, like those according to the first embodiment.

FIG. 12 shows an opposite face to each of the contact faces 112, 113 of the anode side bipolar plate 102 and the cathode side bipolar plate 103, according to the fifth embodiment (herein shown is the opposite face of the anode side bipolar plate 102).

In each of the bipolar plates 102, 103, this opposite face is formed of the linear groove 102c connecting to the manifolds 205, 206 of the coolant. The grooves 102c are so formed as to be line-symmetrical with respect to the symmetry axis Ax, and connect to the manifolds 205, 206 via grooves 205a, 206a increased or decreased in width.

According to the fifth embodiment, on the contact faces 112, 113, the manifolds 201, 202, 203, 204 and the grooves 102a, 103a are so shaped and located as to be reversed with respect to the symmetry axis Ax. Moreover, on the opposite face to the contact face 112, the manifolds 205, 206 of the coolant and the groove 102c are likewise shaped and located. With the above structure, the bipolar plate 102 and the bipolar plate 103 can be used in common between the anode side and the cathode side especially for a water-cooled fuel cell, which is another effect in addition to the effect 1 and the effect 2.

Sixth to Eighth Embodiments

Figure 13A:
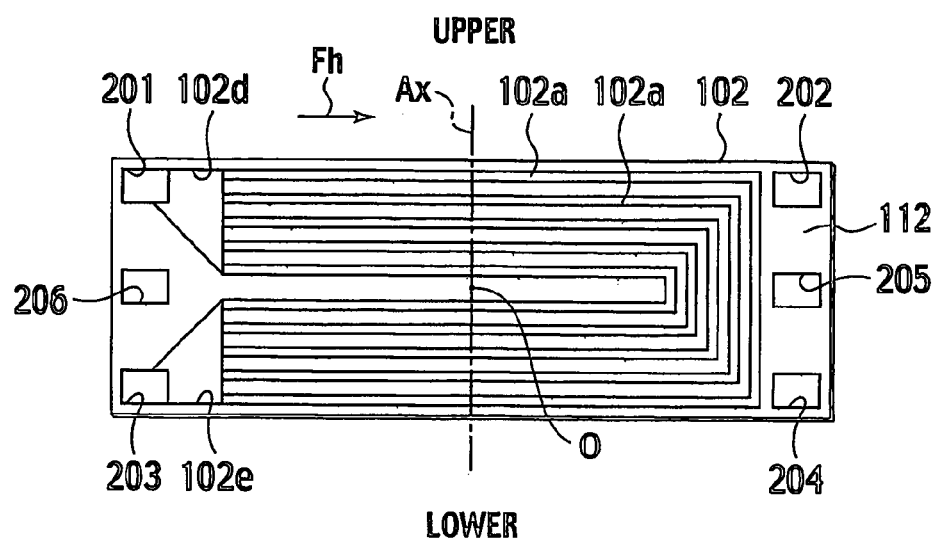
FIG. 13A and FIG. 13B show a fuel gas passage and a cooling water passage on anode side bipolar plate, according to a sixth embodiment.
Figure 13B:
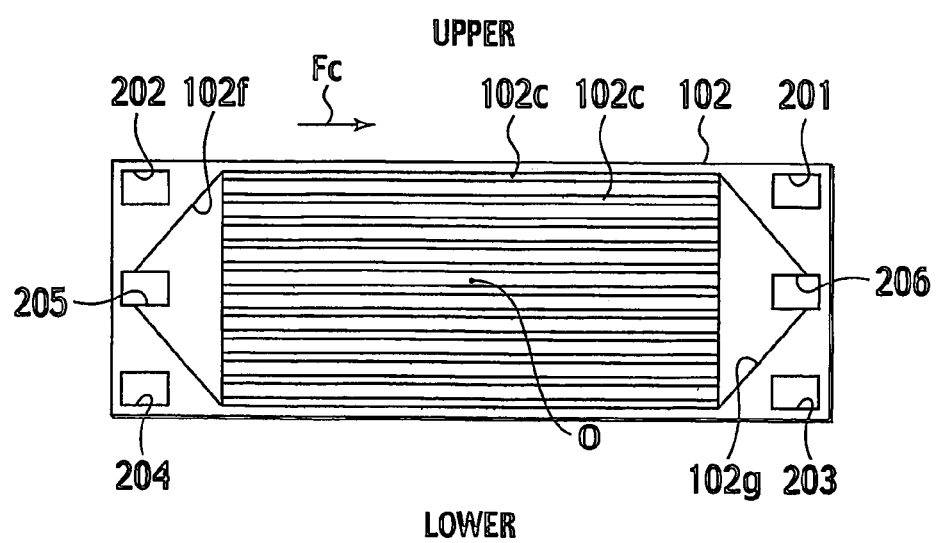
Figure 14A:
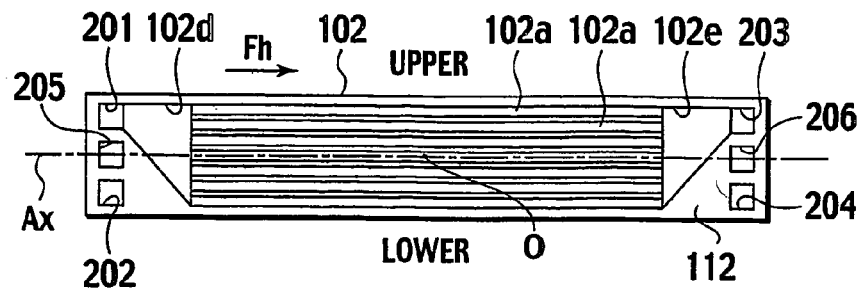
FIG. 14A and FIG. 14B show a fuel gas passage and a cooling water passage on anode side bipolar plate, according to a seventh embodiment.
Figure 14B:
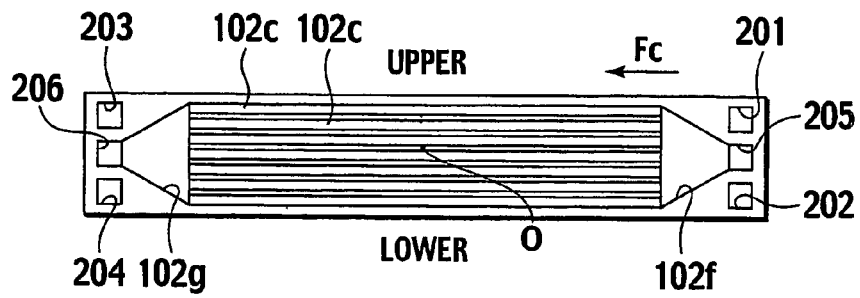
Figure 15A:
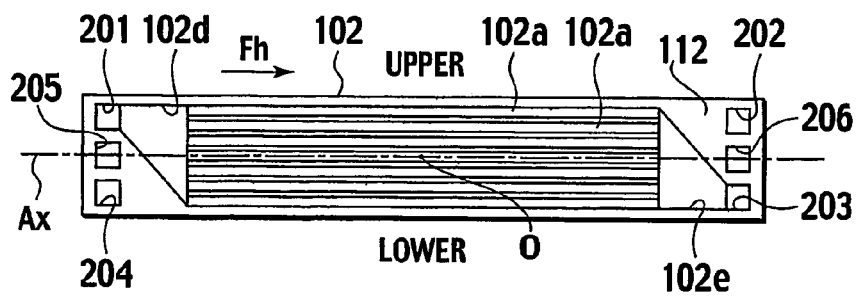
FIG. 15A and FIG. 15B show a fuel gas passage and a cooling water passage on anode side bipolar plate, according to an eighth embodiment.
Figure 15B:
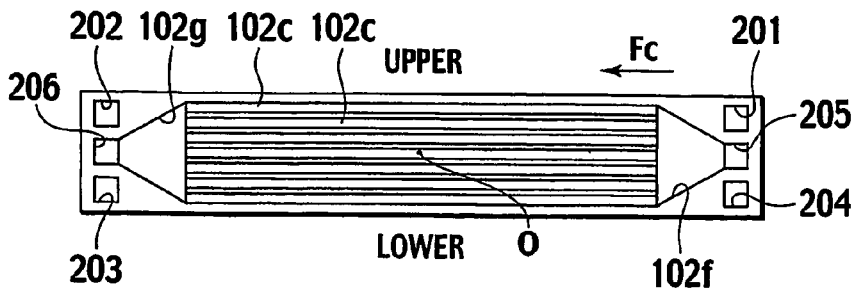

FIG. 13 to FIG. 15 show the contact face 112 of the anode side bipolar plate 102 structuring the fuel cell (in FIG. 13A, FIG. 14A, FIG. 15A) and the opposite face (in FIG. 13B, FIG. 14B, FIG. 15B), according to sixth to eighth embodiments the present invention. According to each of the sixth to eighth embodiments, the bipolar plates 102, 103 can be used in common between the anode side and the cathode side.

In FIG. 13, in each of the bipolar plates 102, 103, the manifolds 201, 203 of the fuel gas, the manifolds 202, 204 of the oxidation gas and the grooves 102a, 102d, 102e, 103a, 103d, 103e are formed like those according to the second embodiment (FIG. 8). In addition, in each of the bipolar plates 102, 103, there are formed on respective edges of the symmetry axis Ax the two manifolds 205, 206 supplying or discharging the coolant. The manifolds 205, 206 of the coolant are formed in such a position as to be line-symmetrical with respect to the symmetry axis Ax. On the opposite face to the contact face 112, there is formed the linear groove 102c connecting to the manifolds 205, 206 of the coolant. The groove 102c connects to the manifolds 205, 206 via grooves 102f, 102g having increased or decreased width, and the grooves 102c, 102f, 102g are formed line-symmetrical with respect to the symmetry axis Ax.

In FIG. 14, in each of the bipolar plates 102, 103, the manifolds 201, 203 of the fuel gas, the manifolds 202, 204 of the oxidation gas and the grooves 102a, 102d, 102e, 103a, 103d, 103e are formed like those according to the third embodiment (FIG. 9). In addition, in each of the bipolar plates 102, 103, there are formed on the symmetry axis Ax the two manifolds 205, 206 supplying or discharging the coolant. On the opposite face to the contact face 112, there is formed the linear groove 102c connecting to the manifolds 205, 206 of the coolant. The groove 102c connects to the manifolds 205, 206 via the grooves 102f, 102g having increased or decreased width, and the grooves 102c, 102f, 102g are formed line-symmetrical with respect to the symmetry axis Ax.

In FIG. 15, in each of the bipolar plates 102, 103, the manifolds 201, 203 of the fuel gas, the manifolds 202, 204 of the oxidation gas and the grooves 102a, 102d, 102e, 103a, 103d, 103e are formed like those according to the fourth embodiment (FIG. 10). Like those according to the seventh embodiment (FIG. 14), in each of the bipolar plates 102, 103, there are formed on the symmetry axis Ax the two manifolds 205, 206 supplying or discharging the coolant, on the opposite face to the contact face 112, there is formed the linear groove 102c connecting to the manifolds 205, 206 of the coolant, and the groove 102c, 102f, 102g are formed line-symmetrical with respect to the symmetry axis Ax.

Ninth Embodiment

Figure 16:
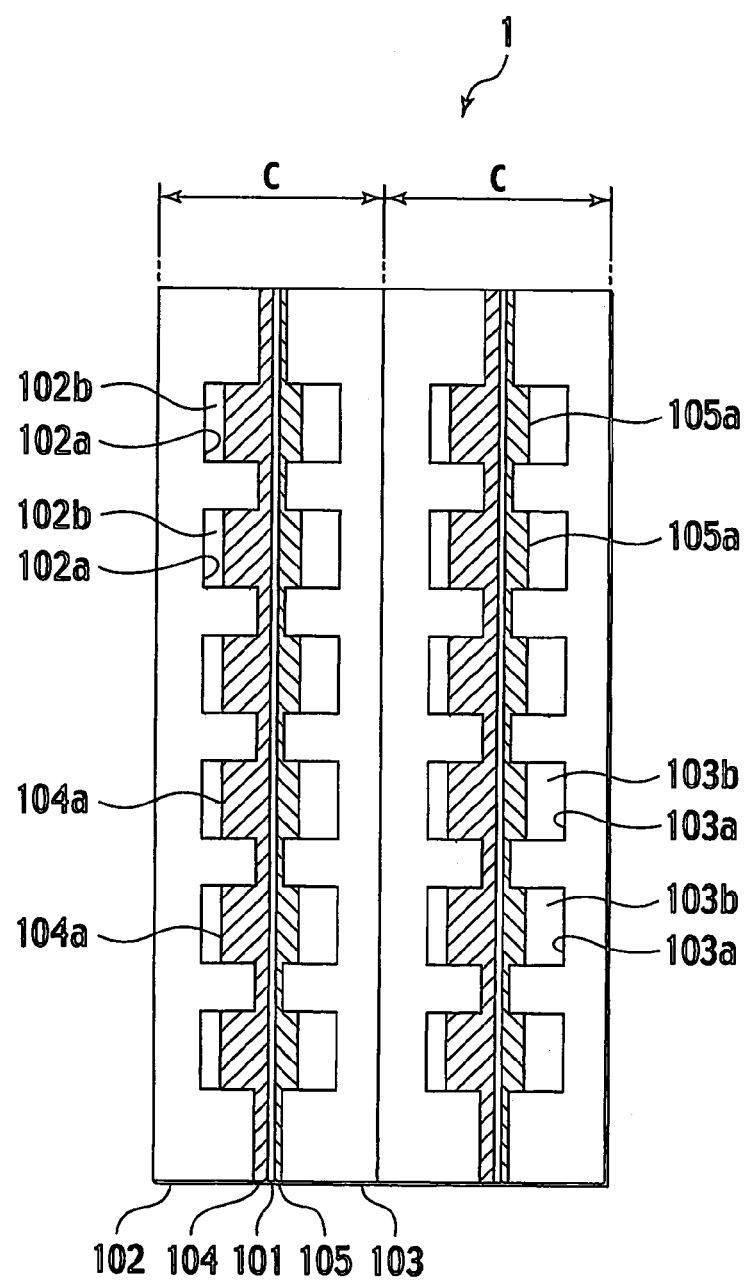
FIG. 16 shows a cross section of the fuel cell body, according to a ninth embodiment of the present invention.
Figure 17A:
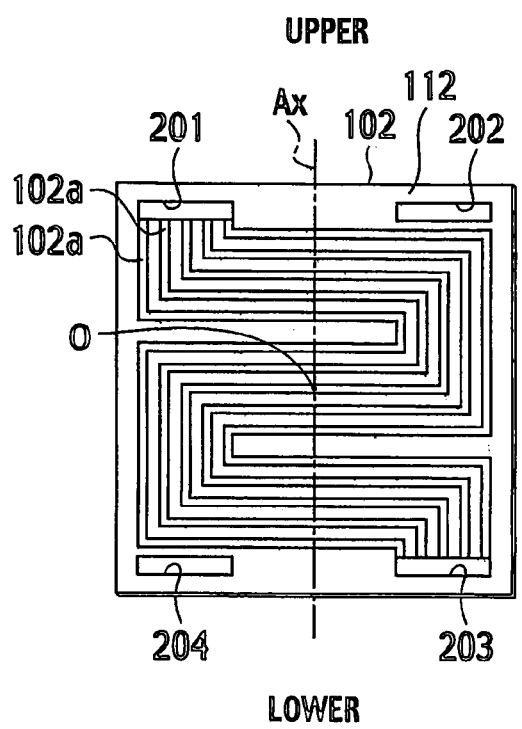
FIG. 17A and FIG. 17B respectively show reaction gas passages on anode side bipolar plate and cathode side bipolar plate, according to the ninth embodiment.
Figure 17B:
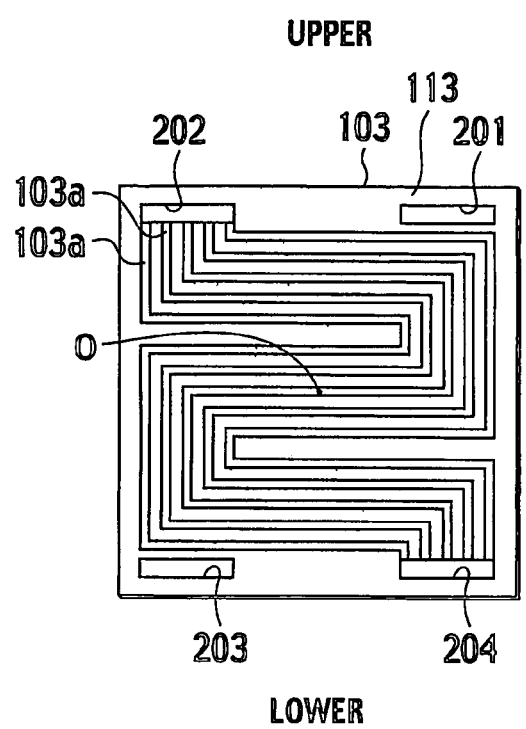

FIG. 16 shows the cross section of the fuel cell body 1, FIG. 17A shows the contact face 112 of the anode side bipolar plate 102 and FIG. 17B shows the contact face 113 of the cathode side bipolar plate 103 which bipolar plates structuring the fuel cell, according to a ninth embodiment of the present invention.

According to the ninth embodiment, an air-cooling device is used for the fuel cell body 1. With this, the anode side bipolar plate 102 and the cathode side bipolar plate 103 are free from the manifolds or the grooves distributing the coolant, suppressing thickness of the unit cell C by a space equivalent to the above free space. Structures other than the cooling system structure are like those according to the fifth embodiment (FIG. 11), specifically, the raised portions 104a, 105a of the respective gas diffusion layers 104, 105 on the respective anode side and cathode side are differentiated in scale (that is, height), in each of the bipolar plates 102, 103, the manifolds 201, 203 of the fuel gas and the manifolds 202, 204 of the oxidation gas are formed on respective diagonal lines, and the grooves 102a, 103a are so formed as to be rotarily symmetrical (point symmetrical), allowing the bipolar plates 102, 103 to be used in common.

Herein, according to the ninth embodiment, a fan for cooling the fuel cell body 101 is disposed, replacing the tank 8, the cooling water circulating passage 9, the pump 10, the radiator 11, the bypass passage 12 and the bypass control valve 13 which are used for water-cooling.

In the above description, based on that the required flow rate of the fuel gas is lower than the required flow rate of the oxidation gas during the operation of the fuel cell, the raised portion 104a of the anode gas diffusion layer 104 is made larger than the raised portion 105a of the cathode gas diffusion layer 105, thereby making the cross section of the fuel gas passage of the anode side bipolar plate 102 smaller than the cross section of the oxidation gas passage of the cathode side bipolar plate 103. The present invention is, however, not limited to the above setting. Specifically, when the oxygen having higher concentration is supplied to the cathode side such that the required flow rate of the oxidation gas becomes smaller, the raised portions 104a, 105a may be so adjusted in scale that the cross section of the oxidation gas passage becomes smaller than the cross section of the fuel gas passage, to thereby secure flow velocity of the cathode side bipolar plate 103.

In addition, when drying is a problem on the anode side, specifically, when humidification on the anode side depends on water exchange from the cathode side, it is preferable to differentiate water retentivity or water repellency between the gas diffusion layers 104, 105 on the respective anode side and cathode side, in addition to differentiating in scale between the raised portions 104a, 105a of the respective gas diffusion layers 104, 105. Allowing the anode gas diffusion layer 104 to have water retentivity while allowing the cathode gas diffusion layer 105 to have water repellency can suppress the dew concentration on the cathode side and prevent drying on the anode side.

The entire contents of Patent Application No. 2004-231753 with its filing date of Aug. 9, 2004 in Japan are incorporated herein by reference.

Although the present invention has been described above by reference to certain embodiments, the present invention is not limited to the embodiments described above. Modifications and variations of the embodiments described above will occur to those skilled in the art, in light of the above teachings.

The scope of the present invention is defined with reference to the following claims.

INDUSTRIAL APPLICABILITY

Under the present invention, the raised portions of the respective anode gas diffusion layer and cathode gas diffusion layer are made different in scale, thereby the cross section of the fuel gas passage on the anode side separator is made different from the cross section of the oxidation gas passage on the cathode side separator. The above structure allows forming of grooves having equal cross section in the anode side separator and cathode side separator, thereby the separators can be used in common between the anode and cathode. In addition, making the raised portion of the anode gas diffusion layer relatively larger increases the area of a contact portion between the anode gas diffusion layer and the anode side separator, decreasing contact resistance therebetween, to thereby increase output of the fuel cell.

The invention claimed is:
1. A fuel cell, comprising:
1) a membrane electrode assembly including:
   i) an electrolyte membrane,
   ii) an anode formed on a first side of the electrolyte membrane, and
   iii) a cathode formed on a second side of the electrolyte membrane opposite to the first side;
2) a first gas diffusion layer configured to diffuse a fuel gas to the anode and having a first raised portion;
3) an anode side separator compressed to the anode with the first gas diffusion layer interposed between the membrane electrode assembly and the anode side separator, wherein the anode side separator has a first contact face facing the first gas diffusion layer, wherein the first contact face is formed with a first groove configured to distribute the fuel gas which is to be diffused to the anode, wherein the first raised portion is raised into a first part of the first groove from a surface of the first contact face, wherein a fuel gas passage is formed in a second part of the first groove as a portion of the first groove other than the first part of the first groove occupied with the first raised portion of the first gas diffusion layer, wherein the fuel gas passage has a first cross section;
4) a second gas diffusion layer configured to diffuse an oxidation gas to the cathode and having a second raised portion; and
5) a cathode side separator compressed to the cathode with the second gas diffusion layer interposed between the membrane electrode assembly and the cathode side separator, wherein the cathode side separator has a second contact face facing the second gas diffusion layer, wherein the second contact face is formed with a second groove configured to distribute the oxidation gas which is to be diffused to the cathode, wherein the second raised portion is raised into a first part of the second groove from a surface of the second contact face, wherein an oxidation gas passage is formed in a second part of the second groove as a portion of the second groove other than the first part of the second groove occupied with the second raised portion of the second gas diffusion layer, wherein the oxidation gas passage has a second cross section,
wherein the first raised portion and the second raised portion are different from each other in scale such that, the first cross section of the fuel gas passage and the second cross section of the oxidation gas passage are different from each other.

2. The fuel cell according to claim 1, wherein the first cross section is smaller than the second cross section.

3. The fuel cell according to claim 2, wherein the first groove and the second groove are substantially equal in cross section, and
wherein the first raised portion's occupying ratio in the first groove is larger than the second raised portion's occupying ratio in the second groove.

4. The fuel cell according to claim 1, wherein the first gas diffusion layer and the second gas diffusion layer have different compression stiffness from each other such that the first raised portion and the second raised portion are different from each other in scale.

5. The fuel cell according to claim 1, wherein an initial thickness of the first gas diffusion layer and an initial thickness of the second gas diffusion layer are different from each other such that the first raised portion and the second raised portion are different from each other in scale.

6. The fuel cell according to claim 1, wherein a fuel gas supplying manifold and a fuel gas discharging manifold, each connecting to the first groove of the anode side separator, are formed substantially diagonally, and
wherein an oxidation gas supplying manifold and an oxidation gas discharging manifold, each connecting to the second groove of the cathode side separator, are so disposed as to be substantially line-symmetrical to the fuel gas supplying manifold and the fuel gas discharging manifold with respect to a straight line which intersects with a central axis of the fuel cell and extends in one of a first direction and a second direction substantially orthogonal to the first direction of the fuel cell.

7. The fuel cell according to claim 1, wherein a fuel gas supplying manifold and a fuel gas discharging manifold, each connecting to the first groove of the anode side separator, are formed on a first edge extending in one of a first direction and a second direction substantially orthogonal to the first direction of the fuel cell, and
wherein an oxidation gas supplying manifold and an oxidation gas discharging manifold, each connecting to the second groove of the cathode side separator, are so disposed on a second edge opposite to the first edge as to be substantially line-symmetrical to the fuel gas supplying manifold and the fuel gas discharging manifold.

8. The fuel cell according to claim 6, wherein the first groove and the second groove are formed substantially linear.

9. The fuel cell according to claim 7, wherein the first groove and the second groove are formed substantially linear.

10. The fuel cell according to claim 6, wherein the first groove and the second groove are so configured as to meander or bend, and
wherein the first groove and the second groove are formed substantially rotationally symmetrical with respect to the central axis of the fuel cell.

11. The fuel cell according to claim 7, wherein the first groove and the second groove are so configured as to meander or bend, and
wherein the first groove and the second groove are formed substantially rotationally symmetrical with respect to a center axis of the fuel cell.

12. The fuel cell according to claim 6, wherein, for at least one of the anode side separator and the cathode side separator, two manifolds for circulating a coolant of the fuel cell are formed on the straight line which serves as a basis for the line symmetry.

13. The fuel cell according to claim 7, wherein, for at least one of the anode side separator and the cathode side separator, two manifolds for circulating a coolant of the fuel cell are formed on a straight line which serves as a basis for the line symmetry.

14. The fuel cell according to claim 7, wherein, for at least one of the anode side separator and the cathode side separator, two manifolds for circulating a coolant of the fuel cell are formed respectively on a first edge and an opposing second edge such that a line symmetry with respect to a straight line which serves as a basis for the line symmetry is formed.

15. The fuel cell according to claim 12, wherein, for the at least one of the anode side separator and the cathode side separator, a passage connecting to the two manifolds for the coolant and configured to distribute the coolant in the at least one of the anode side separator and the cathode side separator is formed substantially line symmetrical with respect to the straight line which serves as the basis for the line symmetry.

16. The fuel cell according to claim 13, wherein, for the at least one of the anode side separator and the cathode side separator, a passage connecting to the two manifolds for the coolant and configured to distribute the coolant in the at least one of the anode side separator and the cathode side separator is formed substantially line symmetrical with respect to the straight line which serves as the basis for the line symmetry.

17. The fuel cell according to claim 14, wherein, for the at least one of the anode side separator and the cathode side separator, a passage connecting to the two manifolds for the coolant and configured to distribute the coolant in the at least one of the anode side separator and the cathode side separator is formed substantially line symmetrical with respect to the straight line which serves as the basis for the line symmetry.

18. The fuel cell according to claim 1, further comprising
a coolant circulating passage connecting to two manifolds for a coolant of the fuel cell,
a cooling unit disposed on the circulating passage and configured to decrease a temperature of the coolant; and
a controller connected to the coolant circulating passage and the cooling unit and configured to control temperature of the fuel cell by adjusting cooling obtained with the cooling unit.

19. The fuel cell according to claim 1, wherein the first gas diffusion layer and the second gas diffusion layer are different from each other in water retentivity.

20. The fuel cell according to claim 1, wherein the first gas diffusion layer is higher than the second gas diffusion layer in at least one of water retentivity and water repellency.

21. A fuel cell, comprising:
a membrane electrode assembly having an anode on one side and a cathode on an opposite side to said one side;
first and second separators, each having a contact face and a groove in said contact face, said grooves of said first and second separators being same in dimension; and
first and second gas diffusion layers;
wherein said first gas diffusion layer is interposed between said contact face of said first separator and said one side of said membrane electrode assembly,
wherein said second gas diffusion layer is interposed between said contact face of said second separator and said opposite side of said membrane electrode assembly,
wherein said first gas diffusion layer protrudes into said groove in said contact face of said first separator during compression applied to said membrane electrode assembly via said first and second separators to make a first raised portion that is raised into said groove in said contact face of said first separator to define a fuel gas passage,
wherein said second gas diffusion layer protrudes into said groove in said contact face of said second separator during said compression applied to said membrane electrode assembly via said first and second separators to make a second raised portion that is raised into said groove in said contact face of said second separator to define an oxidation gas passage,
wherein said first and second gas diffusion layers have a same porosity,
wherein said first gas diffusion layer is thicker in an unstressed initial thickness than said second gas diffusion layer in an unstressed initial thickness,
wherein said first raised portion is raised into said groove in said contact face of said first separator more deeply than said second raised portion is raised into said groove in said contact face of said second separator, such that, for the same grooves of said first and second separators, said fuel gas passage is smaller in cross section than said oxidation gas passage.

22. A fuel cell, comprising:
a membrane electrode assembly having an anode on one side and a cathode on an opposite side to said one side;
first and second separators, each having a contact face and a groove in said contact face, said grooves of said first and second separators being same in dimension; and
first and second gas diffusion layers;
wherein said first gas diffusion layer is interposed between said contact face of said first separator and said one side of said membrane electrode assembly,
wherein said second gas diffusion layer is interposed between said contact face of said second separator and said opposite side of said membrane electrode assembly,
wherein said first gas diffusion layer protrudes into said groove in said contact face of said first separator during compression applied to said membrane electrode assembly via said first and second separators to make a first raised portion that is raised into said groove in said contact face of said first separator to define a fuel gas passage,
wherein said second gas diffusion layer protrudes into said groove in said contact face of said second separator during said compression applied to said membrane electrode assembly via said first and second separators to make a second raised portion that is raised into said groove in said contact face of said second separator to define an oxidation gas passage,
wherein said first and second gas diffusion layers are same in an unstressed initial thickness but having different porosities,
wherein the porosity of said first gas diffusion layer is greater than the porosity of said second gas diffusion layer,
wherein said first raised portion is raised into said groove in said contact face of said first separator more deeply than said second raised portion is raised into said groove in said contact face of said second separator such that, for the same grooves of said first and second separators, said fuel gas passage is smaller in cross section than said oxidation gas passage.

* * * * *